(12) United States Patent
Kim et al.

(10) Patent No.: US 9,036,539 B2
(45) Date of Patent: May 19, 2015

(54) SYNCHRONIZATION METHOD OF FEMTOCELL BASE STATION AND FEMTOCELL BASE STATION USING THE SAME

(75) Inventors: Kwang Soon Kim, Seoul (KR); Young Jin Sang, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 188 days.

(21) Appl. No.: 13/119,611

(22) PCT Filed: Sep. 16, 2009

(86) PCT No.: PCT/KR2009/005266
§ 371 (c)(1),
(2), (4) Date: Mar. 17, 2011

(87) PCT Pub. No.: WO2010/032955
PCT Pub. Date: Mar. 25, 2010

(65) Prior Publication Data
US 2011/0170494 A1    Jul. 14, 2011

(30) Foreign Application Priority Data

Sep. 19, 2008  (KR) .................. 10-2008-0092092

(51) Int. Cl.
*H04W 56/00* (2009.01)
*H04W 92/20* (2009.01)
(52) U.S. Cl.
CPC ...... *H04W 56/0015* (2013.01); *H04W 56/0055* (2013.01); *H04W 92/20* (2013.01)
(58) Field of Classification Search
None
See application file for complete search history.

(56) References Cited

U.S. PATENT DOCUMENTS

| 2005/0233710 | A1* | 10/2005 | Lakkis et al. | 455/102 |
|---|---|---|---|---|
| 2008/0045141 | A1* | 2/2008 | Suga | 455/7 |
| 2008/0095135 | A1 | 4/2008 | Cleveland | |
| 2008/0186949 | A1* | 8/2008 | Hafeez et al. | 370/350 |
| 2008/0192678 | A1* | 8/2008 | Bertrand et al. | 370/328 |
| 2009/0082002 | A1* | 3/2009 | Kim et al. | 455/418 |
| 2009/0097452 | A1* | 4/2009 | Gogic | 370/331 |
| 2009/0122771 | A1* | 5/2009 | Cai | 370/338 |
| 2009/0221295 | A1* | 9/2009 | Sahin et al. | 455/450 |
| 2010/0029295 | A1* | 2/2010 | Touboul et al. | 455/456.1 |
| 2010/0039948 | A1* | 2/2010 | Agrawal et al. | 370/252 |
| 2010/0110983 | A1* | 5/2010 | Fu | 370/328 |
| 2010/0111070 | A1* | 5/2010 | Hsu | 370/350 |
| 2012/0009867 | A1* | 1/2012 | Hwang et al. | 455/7 |

FOREIGN PATENT DOCUMENTS

KR    20060016053 A    2/2006

OTHER PUBLICATIONS

PCT International Search Report for International Application No. PCT/KR2009/005266, dated Apr. 6, 2010, 3 pgs.

* cited by examiner

*Primary Examiner* — Andrew Chriss
*Assistant Examiner* — Joshua A Kading
(74) *Attorney, Agent, or Firm* — Senniger Powers LLP

(57) ABSTRACT

The exemplary embodiment of the present invention provides a method of synchronizing a femtocell base station securing time synchronization of a femtocell base station by allowing the femtocell base station to transmit a symbol to a terminal belonging to the femtocell by performing the time synchronization with a preamble signal when the femtocell base station receives the preamble signal from the macrocell base station in an orthogonal frequency division multiple access (OFDMA) communication system in which a femtocell is present in a macrocell.

8 Claims, 6 Drawing Sheets

SYNCHRONIZATION METHOD OF FEMTOCELL BASE STATION AND FEMTOCELL BASE STATION USING THE SAME

CROSS-REFERENCE TO RELATED APPLICATIONS

This application claims priority to and the benefit of Korean Patent Application No. 10-2008-0092092 filed in the Korean Intellectual Property Office on Sep. 19, 2008, the entire contents of which are incorporated herein by reference.

TECHNICAL FIELD

The present invention relates to a method of synchronizing a femtocell base station and a femtocell base station using the same. In more detail, the present invention relates to a method of synchronizing a femtocell base station and a femtocell base station using the same capable of allowing the femtocell base station to receive preamble signals and synchronizing downlinks based on the received preamble signals while introducing femtocells in order to cover a shadow area in the room or existing cells and allowing the femtocell base station to transmit ranging signals to a macrocell base station and receive uplink synchronization information to secure uplink synchronization of terminals in order to maintain inter-carrier orthogonality while using different subcarriers or the same subcarriers having the same frequency band as macrocells, thereby excluding interference of unwanted signals.

BACKGROUND

An orthogonal frequency division multiple access system (hereinafter, referred to as "OFDMA") implements multiple access by providing a portion of subcarriers usable in OFDM, which is a special type of multicarrier transmission, to each user. A basic principle of the OFDM divides data streams having a high transmission rate into a large number of data streams having a low transmission rate and simultaneously transmits the data streams using a plurality of subcarriers. Symbol duration of the subcarriers having the low transmission rate is increased, such that relative signal dispersion is reduced over time occurring due to multipath delay spread. Inter-symbol interference may be removed by inserting a longer guard interval than delay spread of a channel between the OFDM symbols and when replicating a portion of OFDM signals in the guard interval and disposing the replicated OFDM signal at a start portion of the symbol, the OFDM symbol is cyclically expanded to avoid inter-carrier interference.

The existing wideband code division multiple access system (hereinafter, referred to "WCDMA") does not cause any problem even though it is operated without synchronizing between the base station and the user.

However, in the OFDMA environment, time synchronization of transmitting and receiving ends has a great effect on performance of the system. In the OFDMA environment, when the time synchronization of the transmitting and receiving ends are not performed, the orthogonality between respective subcarriers is lost, thereby deteriorating the performance of the system. Meanwhile, in the mobile communication environment, when there is a shadow area in the room or the existing macrocell in the state where the exiting macrocell base station is present, a need exists for a base station having low power and short coverage in order to solve the problem. The base station is referred to as a femtocell base station.

When the femtocell base station uses the same frequency band as the macrocell base station, there may be a problem in that the orthogonality between the OFDMA subcarriers are lost due to the difference in the receiving and transmitting timing between the femtocell terminal and the macrocell base station.

FIG. 1 is a conceptual diagram for describing a general process of synchronizing between a base station and a terminal at a downlink and an uplink in an OFDMA environment 100.

Referring to FIG. 1, terminal 1 102 performs time synchronization of the downlink based on a timing when the terminal 1 receives a preamble signal P from a base station 101. In addition, the terminal 1 102 transmits a ranging signal R to the base station 101 and the base station 101 measures the ranging signal to transmit uplink synchronization information S to the terminal 1 102, thereby performing the time synchronization of the uplink.

FIG. 2 is a conceptual diagram for describing interference occurring due to inter-carrier asynchronization at the downlink when the femtocell is present in the macrocell region. In FIGS. 2 and 3, CP implies Cyclic Prefix replicating a portion of an OFDM signal.

A femtocell 210 is present at any position within a macrocell 200.

A terminal 1 202 communicates with a macrocell base station 201 and a terminal 2 212 communicates with a femtocell base station 211. In this case, the terminal 1 202 and the terminal 2 212 use different subcarriers and the same subcarriers having the same frequency band to communicate with each corresponding base station.

In this case, the terminal 1 202 may receive a signal 220 transmitted from the macrocell base station 201 and the terminal 2 212 may also receive a signal 221 transmitted from the macrocell base station 201 in addition to a signal 222 transmitted from the femtocell base station 211 and the interference of the signal 221 transmitted from the macrocell base station 201 should be removed. However, when the time synchronization between both signals 221 and 222 is not performed (represented by area A), there are problems in that the inter-carrier orthogonality is lost and the inter-carrier interference occurs.

The terminal 2 212 may receive a signal 230 transmitted from the femtocell base station 211. In addition, the terminal 1 202 may also receive a signal 231 transmitted from the femtocell base station 211 in addition to a signal 232 transmitted from the macrocell base station 201 and the interference of the signal 231 transmitted from the femtocell base station 211 should be removed. However, when the time synchronization between both signals 231 and 232 is not performed (represented by area B), there are problems in that the inter-carrier orthogonality is lost and the inter-carrier interference occurs.

FIG. 3 is a conceptual diagram for describing interference occurring due to inter-carrier asynchronization at the uplink when the femtocell is present in the macrocell region.

Similarly, a femtocell 310 is present at any position within a macrocell 300.

The macrocell base station 301 may receive a signal 320 transmitted from terminal 2 312 in addition to a signal 321 transmitted from terminal 1 302 and the interference of the signal 320 transmitted from the terminal 2 312 should be removed. However, when the time synchronization between both signals 320 and 321 is not performed (represented by area C), there are problems in that the inter-carrier orthogonality is lost and the inter-carrier interference occurs.

In addition, the femtocell base station 311 may also receive a signal 330 transmitted from the terminal 1 302 in addition to a signal 331 transmitted from the terminal 2 312 and the interference of the signal 330 transmitted from the terminal 1 302 should be removed. However, when the time synchronization between both signals 330 and 331 is not performed (represented by area D), there are problems in that the inter-carrier orthogonality is lost and the inter-carrier interference occurs.

SUMMARY

The present invention has been made in an effort to provide a method of synchronizing a femtocell base station and a femtocell base station using the same capable of excluding unwanted interference of signals by maintaining inter-carrier orthogonality while introducing a femtocell in order to cover a shadow area in the room or existing cells and using different subcarriers or the same subcarriers having the same frequency band as a macrocell.

An exemplary embodiment of the present invention provides a method of synchronizing a femtocell base station, including: allowing a femtocell base station to receive preamble signals from a macrocell base station in an orthogonal frequency division multiple access (OFDMA) communication system in which a femtocell is present in a macrocell; and allowing the femtocell base station to transmit a symbol to a terminal belonging to the femtocell by performing time synchronization with the preamble signal to secure the time synchronization of the femtocell base station.

The femtocell may use the same frequency band as the macrocell.

The femtocell may perform transmission using subcarriers different from the macrocell.

The femtocell may perform transmission using the same subcarriers as the macrocell.

Another exemplary embodiment of the present invention provides a method of synchronizing a femtocell base station, including: allowing a femtocell base station to transmit a ranging signal to a macrocell base station in an orthogonal frequency division multiple access (OFDMA) communication system in which a femtocell is present in a macrocell; allowing the macrocell base station to transmit uplink synchronization information to the femtocell base station; and allowing the femtocell base station to instruct uplink synchronization to a terminal belonging to the femtocell to secure time synchronization of the femtocell base station.

The femtocell may use the same frequency band as the macrocell.

The femtocell may perform transmission using subcarriers different from the macrocell.

The femtocell may perform transmission using the same subcarriers as the macrocell.

Yet another exemplary embodiment of the present invention provides a femtocell base station present in a macrocell, including: a deframe generator extracting a preamble signal from a symbol received from a macrocell base station; and a synchronizer performing downlink synchronization to a terminal belonging to the femtocell based on the preamble signal, which is an output of the deframe generator.

The femtocell base station may further include: a ranging signal generator generating a ranging signal to be transmitted to the macrocell base station; and a frame generator configuring a frame using the transmitted data and the ranging signal, wherein the synchronizer acquires uplink synchronization information from the macrocell base station according to the ranging signal to further perform the uplink synchronization to a terminal belonging to the femtocell.

The femtocell base station may further include: a demodulator demodulating the symbol received from the macrocell base station and transmitting the demodulated symbol to the deframe generator, and a detector and decoder detecting and decoding data output from the deframe generator.

The femtocell base station may further include a coding and symbol mapping unit transmitting the transmitted data and the ranging signal output from the ranging signal generator to the frame generator.

The femtocell base station may further include a modulator modulating a frame output from the frame generator to configure a transmitting symbol.

As set forth above, the exemplary embodiments of the present invention allows the femtocell base station to receive the preamble signals and performs the downlink synchronization based on the received preamble signals while introducing the femtocells in order to cover the shadow area in the room or existing cells, thereby making it possible to exclude the interference of unwanted signals by maintaining orthogonality between subcarriers while using different subcarriers or the same subcarriers having the same frequency band as the macrocells.

Further, the exemplary embodiments of the present invention allows the femtocell base station to transmit the ranging signal to the macro cell base station and receive the uplink synchronization information to secure the uplink synchronization of the terminal in order to the inter-carrier orthogonality, thereby making it possible to exclude the unwanted interference of signals.

DETAILED DESCRIPTION

Figure 1:
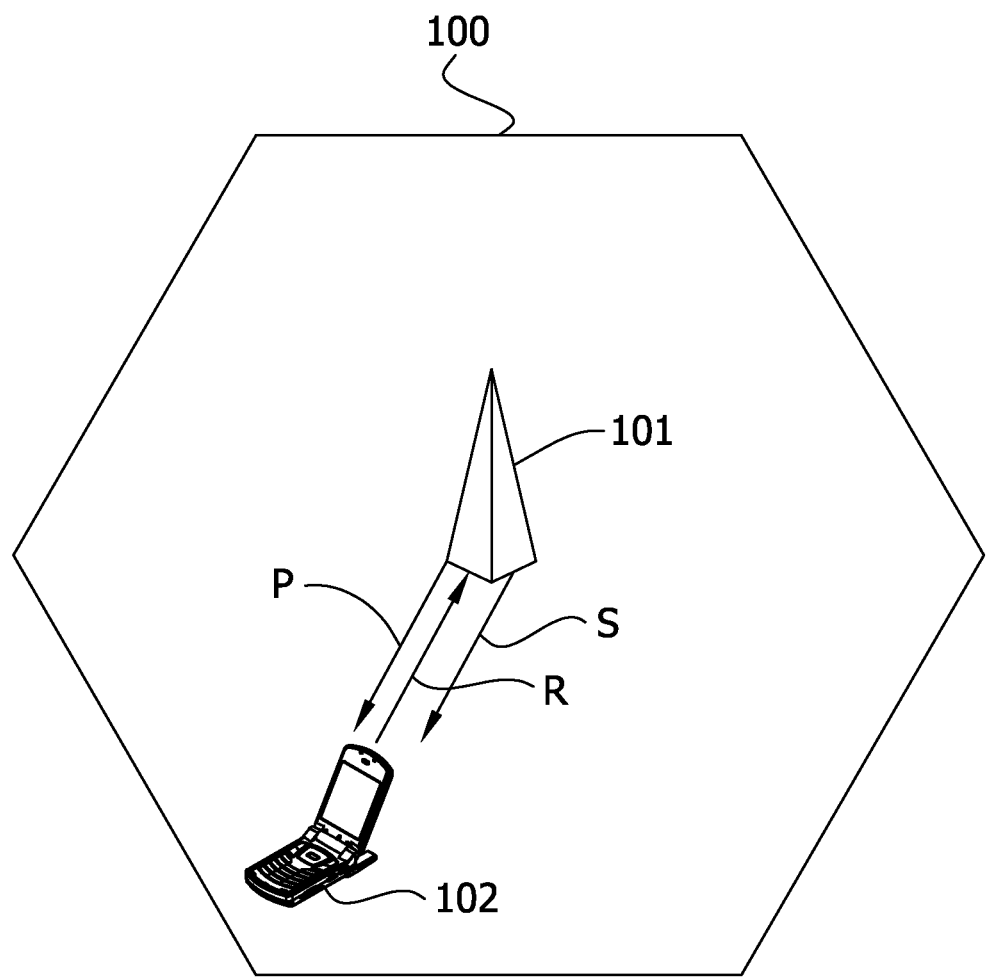
FIG. 1 is a conceptual diagram for describing a general process of synchronizing between a base station and a terminal at a downlink and an uplink in an OFDMA environment.
Figure 2:
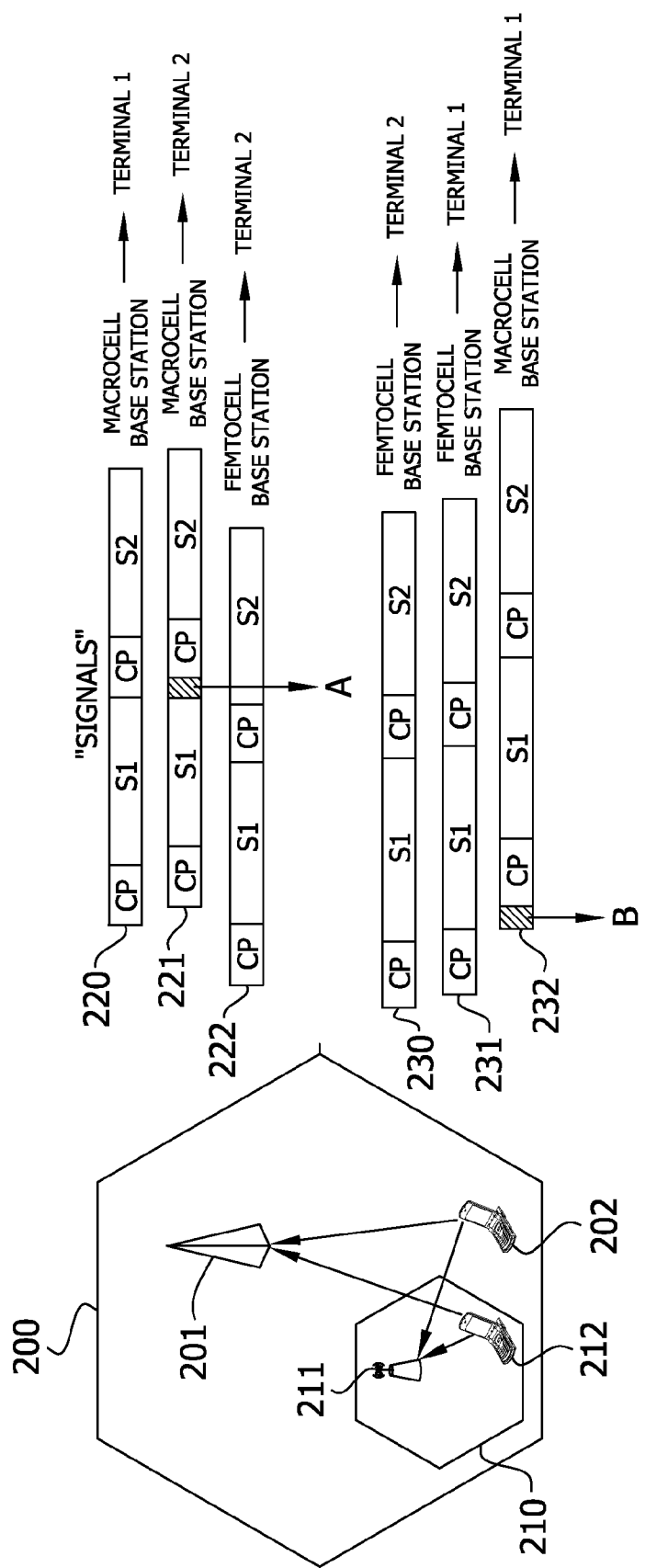
FIG. 2 is a conceptual diagram for describing interference occurring due to inter-carrier asynchronization at the downlink when a femtocell is present in a macrocell region.
Figure 3:
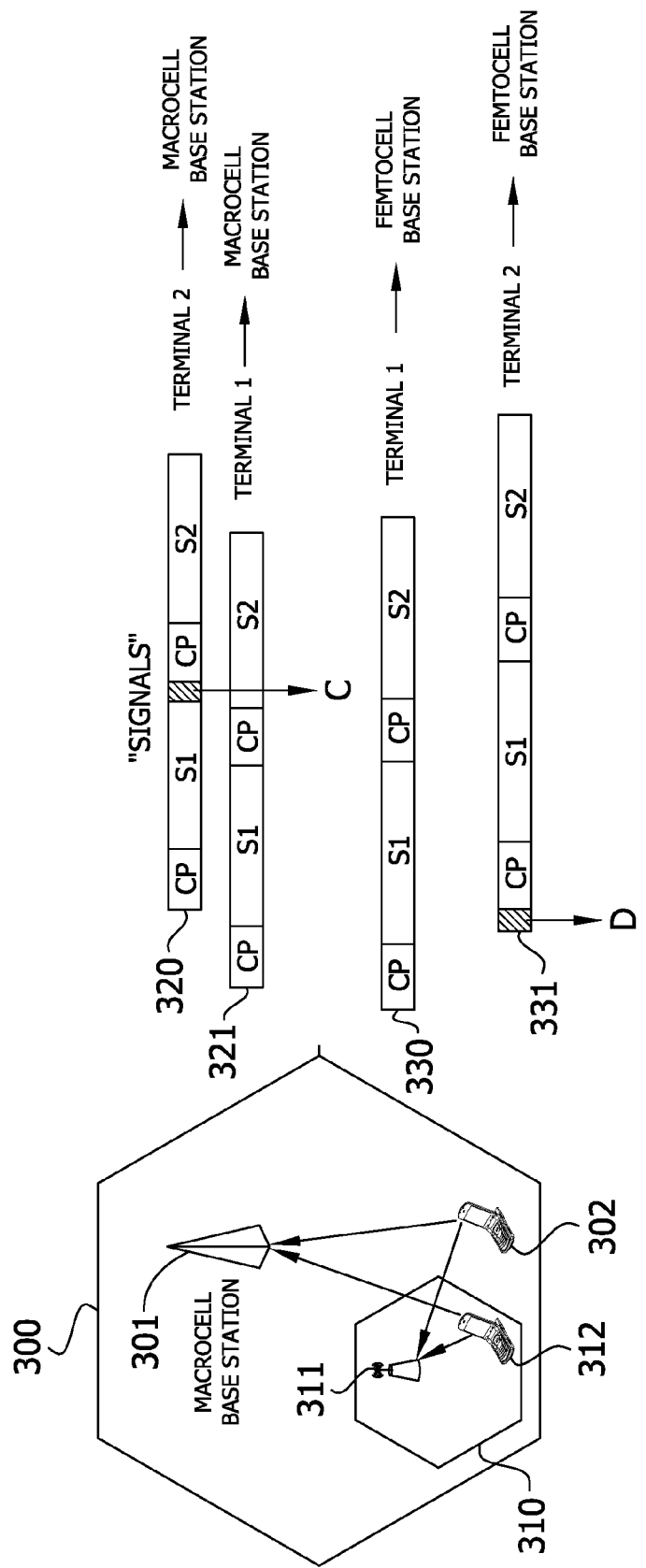
FIG. 3 is a conceptual diagram for describing interference occurring due to inter-carrier asynchronization at the uplink when the femtocell is present in the macrocell region.

Exemplary embodiments of the present invention allows a femtocell base station to perform synchronization to reduce deterioration in performance due to asynchronization between a user of a femtocell and a user of a macrocell.

The femtocell base station according to the exemplary embodiments of the present invention performs synchronization so as not to be affected by interference from the user of the macrocell or so as to minimize the influence of the interference from the user of the macrocell when communicating with the user of the femtocell. That is, a downlink start timing of the femtocell base station matches a receiving timing from the macrocell base station and an uplink start timing of a terminal present in the femtocell matches a timing similar to a terminal present in the macrocell.

Hereinafter, exemplary embodiments of the present invention will be described in detail with reference to the accompanying drawings. First of all, it is to be noted that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the exemplary embodiment of the present invention will be described, but it will be understood to those skilled in the art that the spirit and scope of the present invention are not limited thereto and various modifications and changes can be made.

The present invention relates to a method of synchronizing a femtocell base station and a femtocell base station using the same capable of allowing the femtocell base station to receive preamble signals and synchronizing downlinks based on the received preamble signals while introducing femtocells in order to cover a shadow area in the room or existing cells and allowing the femtocell base station to transmit ranging signals to a macrocell base station and receive uplink synchronization information to secure uplink synchronization of terminals in order to maintain inter-carrier orthogonality while using different subcarriers or the same subcarriers having the same frequency band as macrocells, thereby excluding interference of unwanted signals.

To this end, the exemplary embodiment of the present invention provides a method of synchronizing a femtocell base station securing time synchronization of a femtocell base station by allowing the femtocell base station to transmit a symbol to a terminal belonging to the femtocell by performing the time synchronization with a preamble signal when the femtocell base station receives the preamble signal from the macrocell base station in an orthogonal frequency division multiple access (OFDMA) communication system in which a femtocell is present in a macrocell.

Figure 4:
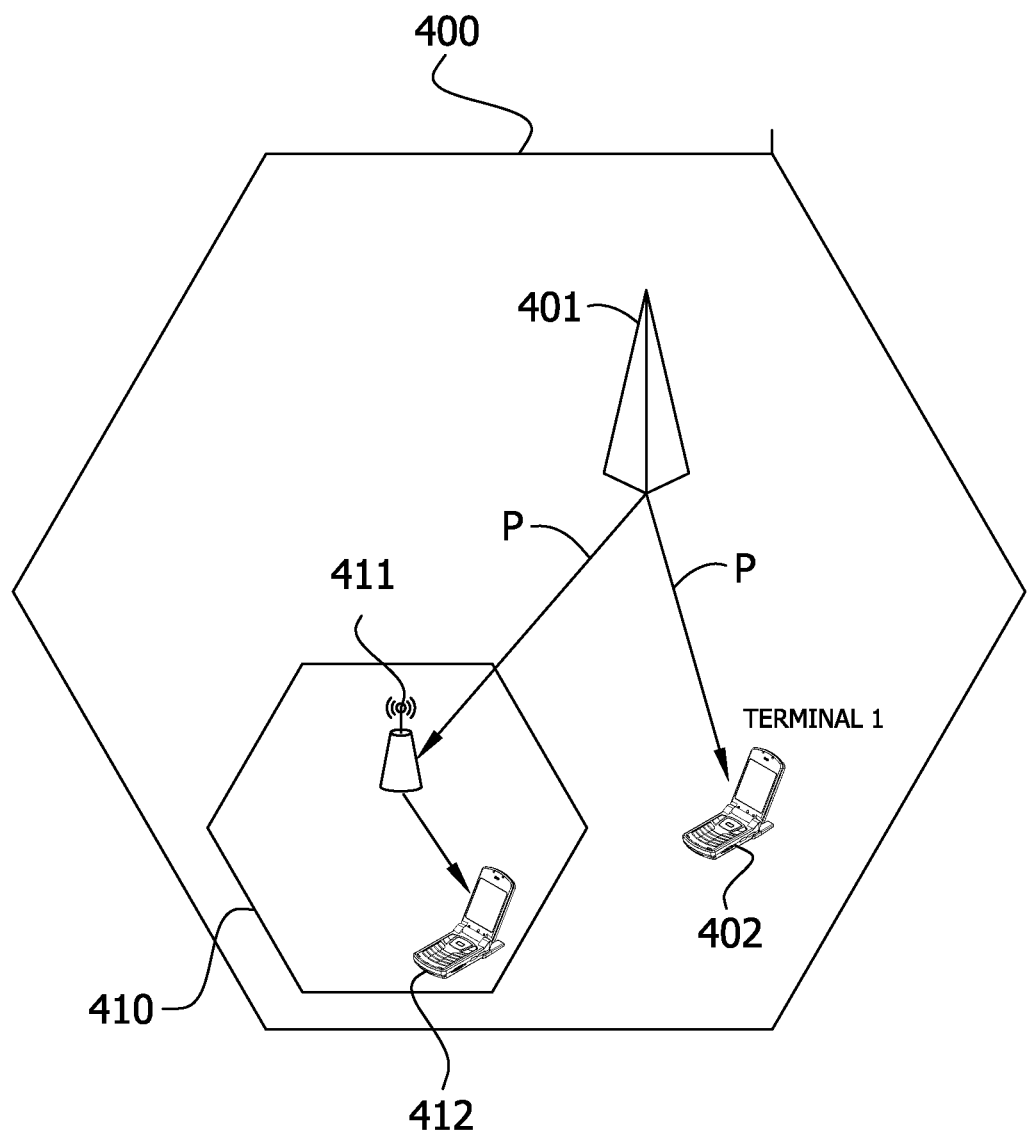
FIG. 4 is a conceptual diagram for describing a method of allowing a femtocell base station to perform synchronization at a downlink, according to an exemplary embodiment of the present invention.

FIG. 4 is a conceptual diagram for describing a method of allowing a femtocell base station to perform synchronization at a downlink, according to an exemplary embodiment of the present invention.

A femtocell 410 is present at any position within a macrocell 400.

A terminal 1 402 communicates with a macrocell base station 402 and a terminal 2 412 communicates with a femtocell base station 411. In this case, the terminal 1 402 and the terminal 2 412 use different subcarriers and the same subcarriers having the same frequency band to communicate with each corresponding base station.

In this case, the terminal 2 412 may also receive a signal transmitted from the macrocell base station 401 in addition to a signal transmitted from the femtocell base station 411 and the interference of a signal transmitted from the macrocell base station 401 should be removed. In order for the terminal 2 412 to remove the interference of the signal transmitted from the macrocell base station 401, the starting point of signal transmitted from the macrocell base station 401 is to be in the CP of the signal transmitted from the femtocell base station 411.

To this end, the femtocell base station 411 receives a preamble signal P from the macrocell base station 401 and performs time synchronization with the received preamble signal P to transmit a symbol to the terminal 2 412, thereby securing the time synchronization. That is, the femtocell base station 411 performs a role of a kind of terminal present in the macrocell 400.

A distance between the femtocell base station 411 and the terminal 2 412 is relatively very short as compared to a distance between the macrocell base station 401 and the terminal 1 402. Therefore, when the downlink start timing of the femtocell base station 411 for the terminal 2 412 matches the receiving timing of the preamble signal P from the macrocell base station 401, the signal transmitted from the femtocell base station 411 synchronizes with the signal transmitted from the macrocell base station 401 in view of the terminal 2 412. That is, in the case of the terminal 2 412, the CP interval of the signal received from the femtocell base station 411 and the signal received from the macrocell base station 401 overlaps with each other, such that the receiving timing of both signals is present in a guard interval of an OFDM symbol. As a result, both signals maintains inter-carrier orthogonality, such that the terminal 2 412 may remove the interference of the signal received from the macrocell base station 401 at the signal received from the femtocell base station 411.

When the terminal 1 402 and the terminal 2 412 use different subcarriers, they do not cause interference with each other if there is the inter-carrier orthogonality. Even when the terminal 1 402 and the terminal 2 412 use the same subcarriers, they use a method such as an interference cancellation method, thereby making it possible to successfully perform communication.

Figure 5:
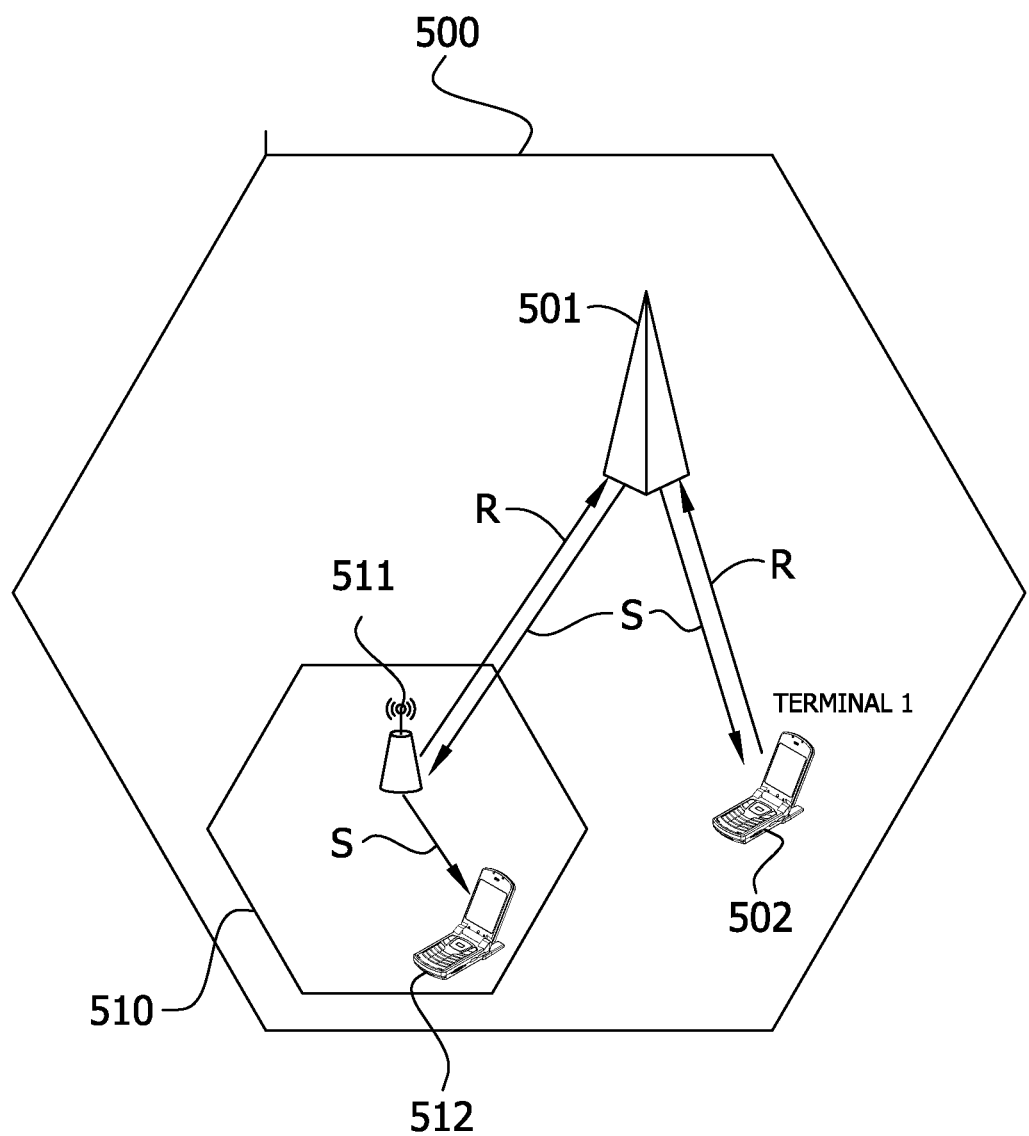
FIG. 5 is a conceptual diagram for describing a method of allowing a femtocell base station to perform synchronization at an uplink, according to an exemplary embodiment of the present invention.

FIG. 5 is a conceptual diagram for describing a method of allowing a femtocell base station to perform synchronization at an uplink, according to an exemplary embodiment of the present invention.

A femtocell 510 is present at any position within a macrocell 500. When the terminal 1 502 and the terminal 2 512 transmit the signal to different base stations at a position adjacent to each other, a case where synchronization is not performed at different base stations may occur.

The macrocell base station 501 may receive a signal transmitted from terminal 2 512 in addition to a signal transmitted from terminal 1 502 and the interference of the signal transmitted from the terminal 2 512 should be removed. To this end, both signals transmitted from the terminal 1 502 and the terminal 2 512 may be synchronized in terms of the macrocell base station 501 by adjusting the uplink transmitting timing of the terminal 2 512 to be similar to the uplink transmitting timing of the terminal 1 502.

To this end, the femtocell base station 511 serves as a kind of terminal. That is, the femtocell base station 511 transmits the ranging signal R to the macrocell base station 501 to transmit the uplink signal. Through this, the macrocell base station 501 recognizes that the terminal belonging to the femtocell base station 511 has data to be transmitted to the uplink and transmits the uplink synchronization information S to the femtocell base station 511 in consideration of the transmitting timing of the terminal 1 502. The femtocell base station 511 transmits the uplink synchronization information S to the terminal 2 512 to instruct the uplink synchronization to the terminal 2 512. The terminal 2 512 holds the uplink transmitting timing according to the received uplink synchronization information S to transmit data.

As a result, the uplink transmitting timing of the terminal 2 512 is similar to the uplink transmitting time of the terminal 1 502 at a position adjacent thereto. That is, in the case of the macrocell base station 501, the CP interval of the signal received from the terminal 1 502 and the signal received from the terminal 2 512 overlaps with each other, such that the receiving timing of both signals is present in the guard interval of an OFDM symbol. As a result, both signals maintains inter-carrier orthogonality, such that the macrocell base station 501 may remove the interference of the signal received from the terminal 2 512 at the signal received from the terminal 1 502.

When the macrocell 500 and the femtocell 510 uses different subcarriers, they do not cause interference with each other if there is the inter-carrier orthogonality. Even when the macrocell 500 and the femtocell 510 use the same subcarriers, it is already mentioned that they can successfully perform the communication by using the method such as the interference cancellation method.

Figure 6:
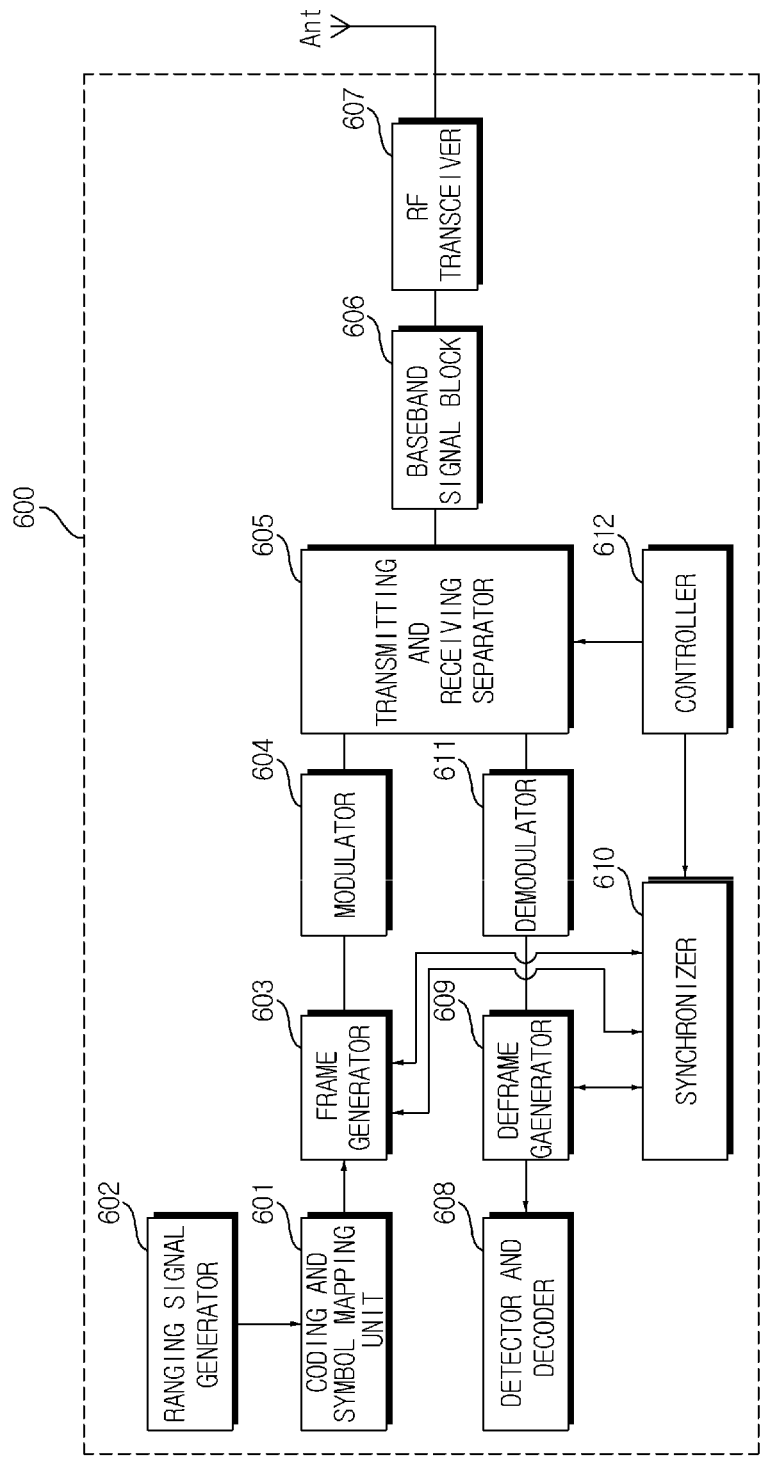
FIG. 6 is a block diagram of a femtocell base station according to an exemplary embodiment of the present invention.

FIG. 6 is a block diagram of a femtocell base station according to an exemplary embodiment of the present invention.

A femtocell base station 600 according to the exemplary embodiment of the present invention, referring to FIG. 6, is configured to include a coding and symbol mapping unit 601, a ranging signal generator 602, a frame generator 603, a modulator 604, a transmitting and receiving separator 605, a baseband signal block 606, and an RF transceiver 607. In addition, the femtocell base station 600 is configured to include a detector and decoder 608, a deframe generator 609, a synchronizer 610, a demodulator 611, and a controller 612.

The ranging signal generator 602 is a device that generates the transmitted ranging signal to allow the femtocell base station 600 to receive the uplink synchronization information from the macrocell base station.

The coding and symbol mapping unit 601 codes the transmitted data and the ranging signal output from the ranging signal generator 602 and performs the symbol mapping thereon to output it to the frame generator 603. The frame generator 603 uses the transmitted data and the ranging signal to configure the frame and then, output it to the modulator 604.

The modulator 604 modulates the frame output from the frame generator 603 and uses the pulse shaping filter to configure the transmitting symbol and then, output it to the transmitting and receiving separator 605.

The synchronizer 610 obtains the uplink synchronization information of the terminal from the uplink synchronization information obtained from the macrocell base station.

The transmitting and receiving separator 605 transmits the transmitting symbol to the terminal through the RF transceiver 607 via the baseband signal block 606 according to the transmitting and receiving time information received from the controller 612.

Meanwhile, the symbol transmitted from the terminal and received in the RF transceiver 607 is transmitted to the transmitting and receiving separator 605 through the baseband signal block 606. Thereafter, the received symbol is demodulated through the demodulator 611 and is then transmitted to the deframe generator 609. The deframe generator 609 extracts the preamble signal from the receiving symbol and transmits it to the synchronizer 610.

The synchronizer 610 performs the downlink synchronization to the terminal based on the preamble signal, which is an output of the deframe generator 609. The detector and decoder 608 detects and decodes the data signal and the control signal output through the deframe generator 608.

The exemplary embodiment of the present invention relates to the femtocell base station actively introduced by the mobile communication service providers and can solve the interference problem between the femtocell base station and the existing cell, such that it can be prevalently applied to a mobile communication field.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A method of synchronizing a femtocell base station, comprising:
    allowing the femtocell base station to receive a preamble signal from a macrocell base station in an orthogonal frequency division multiple access (OFDMA) communication system in which a femtocell is present at any location within a macrocell;
    performing a downlink synchronization of the femtocell with the received preamble signal, wherein the downlink synchronization includes matching downlink transmission start timing from the femtocell base station with the reception timing of a preamble signal having a first cyclic prefix (CP) from the macrocell base station;
    allowing the femtocell base station to transmit a symbol having a second CP to a terminal belonging to the femtocell,
    wherein the first CP and the second CP overlap within a guard interval of an OFDM symbol, and
    wherein the downlink synchronization is performed at least when interference between the femtocell and the macrocell occurs.

2. The method of claim 1, wherein the femtocell uses the same frequency band as the macrocell.

3. The method of claim 2, wherein the femtocell performs transmission using subcarriers different from the macrocell.

4. The method of claim 2, wherein the femtocell performs transmission using the same subcarriers as the macrocell.

5. A femtocell base station present in a macrocell, comprising:
    an RF transceiver configured to receive a preamble signal from a macrocell base station in an orthogonal frequency division multiple access (OFDMA) communication system in which a femtocell is present at any location within a macrocell;
    a synchronizer configured to perform downlink synchronization with the received preamble signal, wherein the downlink synchronization includes matching downlink transmission start timing from the femtocell base station with the reception timing of a preamble signal from the macrocell base station;
    a ranging signal generator configured to generate a ranging signal and data to be transmitted to the macrocell base station; and
    a frame generator configured to produce a frame using the to be transmitted data and the ranging signal,
    wherein the synchronizer acquires uplink synchronization information from the macrocell base station according to the ranging signal to further perform the uplink synchronization to a terminal belonging to the femtocell by overlapping cyclic prefixes of signals transmitted from the at least one of the terminals within a guard interval of an OFDMA symbol by adjusting the uplink transmitting timing of the terminal to remove signal interference, and wherein the synchronizer performs the downlink synchronization at least when interference between the femtocell and the macrocell occurs.

6. The femtocell base station of claim 5, further comprising:
   a demodulator configured to demodulate a symbol received from the macrocell base station and configured to transmit the demodulated symbol to a deframe generator; and
   a detector configured to detect and a decoder configured to decode a data signal and a control signal output from the deframe generator.

7. The femtocell base station of claim 5, further comprising a coding and symbol mapping unit configured to transmit the to be transmitted data and the ranging signal output from the ranging signal generator to the frame generator.

8. The femtocell base station of claim 7, further comprising a modulator configured to modulate a frame output from the frame generator to configure a transmitting symbol.

\* \* \* \* \*